July 4, 1950 — C. H. HOLDER — 2,514,282
CHEMICAL PROCESS FOR THE PRODUCTION OF CARBON MONOXIDE
Filed Oct. 17, 1945
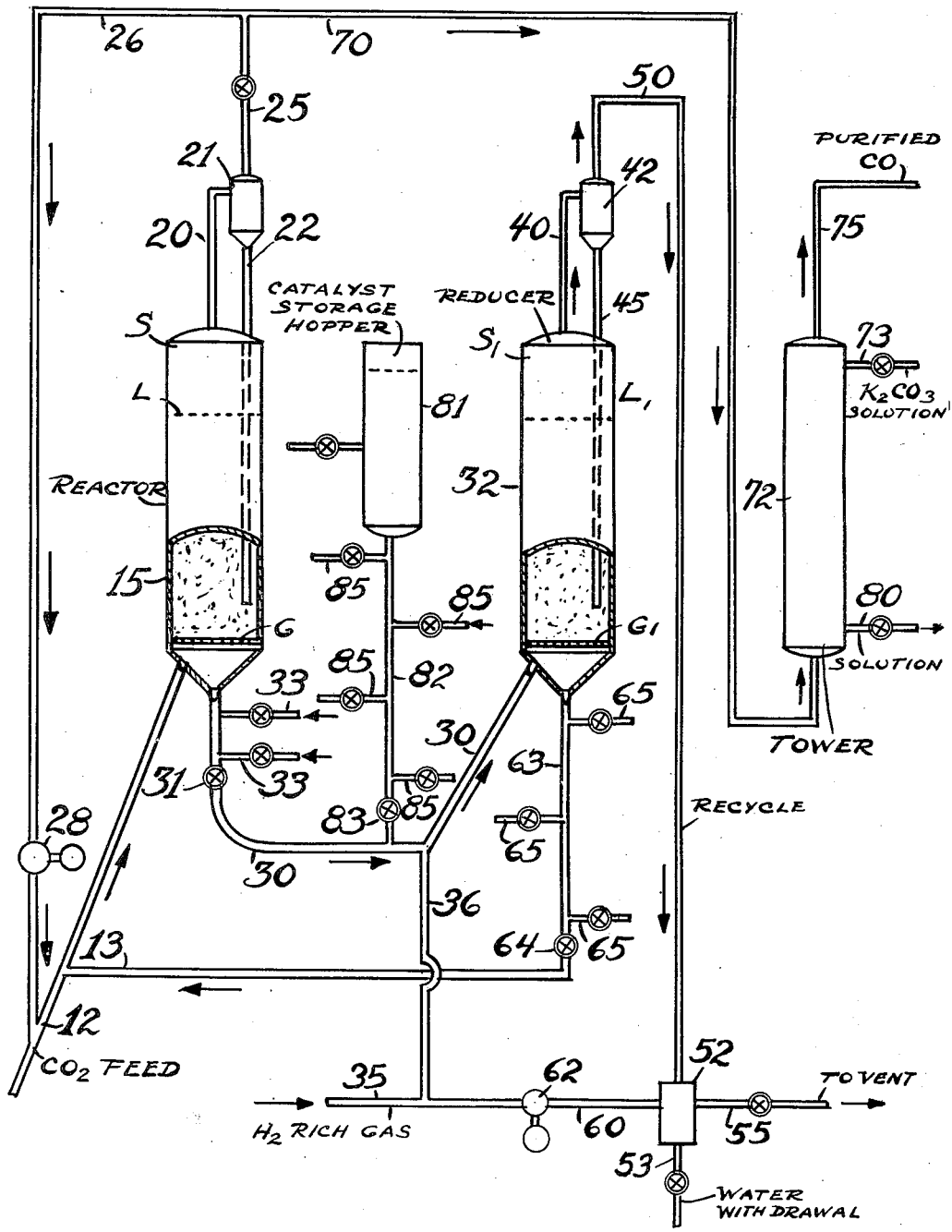
Clinton H. Holder Inventor
By R. J. Whelan Attorney Patented July 4, 1950

2,514,282

UNITED STATES PATENT OFFICE 2,514,282

CHEMICAL PROCESS FOR THE PRODUCTION OF CARBON MONOXIDE

Clinton H. Holder, Cranford, N. J., assignor to Standard Oil Development Company, a corporation of Delaware Application October 17, 1945, Serial No. 622,798

4 Claims. (Cl. 23—204)

The novel features of my invention are fully described in the following specification and claims.

The main object of the invention is to produce a pure grade of carbon monoxide.

At the present time, the petroleum industry researches are being directed toward developing processes for the production of hydrocarbons from CO and hydrogen. As the crude oil sources become depleted, processes such as the Fischer process for the reaction of carbon monoxide with hydrogen to form hydrocarbons, alcohols, etc., will become more important in that they represent a method of preparing hydrocarbons from practically the basic constituents, carbon and hydrogen.

One old method of obtaining carbon monoxide rather inexpensively involves passing steam over hot coal or coke. The product obtained contains a plurality of inert and unwanted gases which are difficult to remove, so that the purity of the product is below that desirable for use in the Fischer Synthesis and similar processes. This is exemplified by the following approximate analysis of a commercial grade of carbon monoxide:

| | Per cent |
|---|---|
| CO | 88 |
| $N_2$ | 4–5 |
| $H_2$ | 4–5 |
| $CO_2$ and $O_2$ | 0.2–2 |

Since $N_2$, $H_2$, and CO have similar vapor pressure characteristics and do not respond to commonly used and/or practical chemical methods of separation, the problem of purifying the carbon monoxide is difficult and expensive.

My present invention relates to a method of producing a pure grade of carbon monoxide, and in brief compass involves passing carbon dioxide over carrier materials containing oxides of the metals of group VI of the periodic table, which oxides have been reduced previously by treatment with $H_2$. Without wishing to be limited to the specific details therein contained, but rather merely to illustrate my invention, I set forth below a specific example illustrating my invention.

Example

Substantially pure carbon dioxide was passed over a molybdenum oxide on alumina which had been previously reduced by treatment with an excess of hydrogen at 1000° F. under atmospheric pressure. The carbon dioxide was fed at a rate of 10 volumes of carbon monoxide per volume of catalyst per hour, the temperature being maintained at 1000° F. whereas the pressure was atmospheric. A sample of the gas issuing from the reaction zone was analyzed and found to contain 30% carbon monoxide. In another run made under the same condition, the gas issuing from the reaction mass contained 24.4 volume per cent carbon monoxide.

Without wishing to be bound by any theory, it is my belief that the mechanism involved in the reaction taking place in the foregoing example may be represented by the below equation:

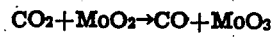

$$CO_2 + MoO_2 \rightarrow CO + MoO_3$$

An analysis and inspection of the carrier material show that there was no overall absorption of gas, indicating that a mole of CO was present in the outlet gas per each mole of $CO_2$ that reacted with the molybdenum oxide on the carrier material.

In the accompanying drawing, I have shown diagrammatically an apparatus in which a preferred modification of my invention may be carried into effect.

The process shown is cyclic in nature, there being a reaction period during which the $CO_2$ is reduced by the VI group heavy metal oxide; following this step there is a reduction period in which the oxidized heavy metal oxide is contacted with hydrogen in order to return it to the lower valence state required for its reaction with the carbon dioxide feed.

Referring in detail to the drawing, $CO_2$ (obtained, say, from flue gas by scrubbing with an aqueous solution of, say, $K_2CO_3$ to dissolve out the $CO_2$ in an absorption tower, from which the solution is removed and heated in a separate tower to drive off and recover the $CO_2$) is introduced in the present system through line 12 and thereafter mixed with a powdered material of the character described, such as molybdenous oxide, which passes from line 13 into line 12, where it mixes with the $CO_2$ to form a suspension which is thereafter conveyed to a reactor 15. Reactor 15 is of the delayed settler type, that is to say, the molybdenum oxide in powdered form having a particle size of from 40 microns to 200 mesh forms within the reactor 15 a dense, turbulent suspension maintained by controlling the velocity of the $CO_2$ as it passes upwardly in reactor 15 within the limits of from ½–10, preferably from ½ to 3, ft./sec. It will be noted that the reactor is provided with a foraminous member G, through which the suspension passes, the function of the perforate plate or grid G being to aid in the distribution of the suspension. The dense suspension will have an upper level at L depending on the actual number of pounds of powdered molybdenous oxide fed to reactor 15 and, of course, the height of the reactor. Above L, there is a disengaging space S in which the concentration of solid in gas decreases sharply so that when the gas eventually issues through line 20, it is greatly depleted in solids content. To further remove entrained solids, the suspension is passed through one or more centrifugal separators 21 for the purpose of separating out powdered solid material which latter material is returned via dip pipe 22 to the main body of powdered material in the reactor 15. In the reactor the carbon dioxide is reduced to carbon monoxide while, of course, the molybdenous oxide is oxidized to molybdic oxide, at least in part. Referring again to the product issuing from the reactor, the same is withdrawn from the centrifugal separator or separators 21 through a line 25 and at least in part recycled through line 26 carrying a pump 28. This recycling of the product in part increases the conversion level. It is advisable to regulate the weight ratio of $CO_2$ to molybdenous oxide fed to the reactor at a value which is slightly below the stoichiometric weight ratios which are about 0.34 pound of carbon dioxide per pound of molybdenous oxide. I find that the recycle gas to fresh feed ratio should be from 5–15 volumes of gas in line 26 per volume of CO in line 12. I have further found that in order to provide adequate fluidization of the molybdenous oxide in the reactor 15 the velocity of the gas (that is, the $CO_2$ and other gases passing through the reactor) is rather critical and should be maintained within the limits of from about 0.3–0.5 ft./sec. In a reactor which contains a fluidized bed of powdered material 10 feet high (10 feet from G to L) the weight of $CO_2$ per unit weight of molybdenous oxide per hour fed to the reactor would be about 0.4. In this rate the combined fresh feed and recycle streams (lines 12 and 26) are included.

The oxidized powdered material is withdrawn from the reactor through line 30 and thence passed into a reducing zone 32 where it is treated with hydrogen-rich gas which enters the system through line 35, passes through line 36 and thence into line 30 where it mixes with the oxidized molybdenum oxide to form a suspension which is carried into the bottom of reducer 32, also provided with a foraminous member $G_1$. In controlling the flow of molybdic oxide from reactor 15, I provide a slide valve 31; and furthermore, it is preferable to provide line 30 with a plurality of taps 33 into which slow currents of gas may be injected for the purpose of fluidizing the material in the drawoff line 30. The suspension in reducer 32 is formed into a dense ebullient mass b, controlling the upward velocity of the gas in the same manner and within the same limits as those specified in accomplishing the same result in reactor 15. In reducer 32 the molybdic oxide is reduced and after passing through the body of dense phase suspension disposed between $G_1$ and $L_1$, the gas passes into a disengaging space $S_1$ where the catalyst separates out and eventually the gas is withdrawn through line 40. Since, however, as in the case of reactor 15, the gas will still contain entrained catalyst, it is forced through one or more centrifugal separators 42 for the purpose of separating out finely divided solid material which is returned by dip pipe 45 to the main body in reducer 32. The gas is withdrawn from the separator or separators through line 50, thence discharged into a water separator 52. Of course, it will be understood that hydrogen gas reacts with the molybdic oxide to form water and the water formed is separated from the gas in separator 52 and withdrawn through line 53, while the hydrogen-containing gas is either vented from the system through line 55 or preferably vented only in part through line 55, the remainder being recycled through line 60, pump 62, and line 36 back to the reducer. Meanwhile, the reduced molybdenum oxide is withdrawn through line 63 carrying a flow control valve 64 and gas taps 65, while injecting through the latter slow currents of gas for the purpose of fluidizing the downflowing molybdenum oxide.

Referring again to centrifugal separators 21, it will be recalled that a portion of the material withdrawn through line 25 is recycled to the reactor 15. However, a stream for product recovery is taken off and this material is recovered via line 70 and thence discharged into a scrubber 72 where it is caused to flow upwardly against a downflowing solution of potassium carbonate introduced through line 73. The purpose of the potassium carbonate solution is to scrub out the unconverted $CO_2$. The thus purified carbon monoxide is withdrawn overhead from scrubber 72 through line 75 and delivered to storage (not shown). The solution of potassium carbonate containing dissolved $CO_2$ is withdrawn through line 80 and after heating (in apparatus not shown) to remove $CO_2$, the same is returned to the scrubber via line 73.

It should be pointed out that the amount of hydrogen fed to the reducer 32 from the fresh feed stream and the recycle stream is slightly in excess of the theoretical amount required to reduce molybdic oxide to molybdenous oxide. The amount of hydrogen supplied to the reducer 32 is adjusted so that the total hydrogen from the fresh feed line 35 and recycle line 60 is about 0.02 pound of hydrogen per pound of molybdic oxide per hour.

Molybdenous oxide may be added to the system as desired from a storage hopper 81 through a line 82 carrying slide valve 83 and provided with the usual gas taps 85 through which gas may be introduced into the drawoff pipe 82 for the purpose of increasing the fluidity of the powder therein.

The amount of unreacted carbon dioxide passing through the system is a function of the extent of recycling product to the reaction zone. Even with the recycling of product to the reaction zone, the stream entering the scrubber 72 via line 70 may contain 10–15 per cent of unconverted $CO_2$. However, this is effectively removed by the countercurrent scrubbing operation in scrubber 72, previously described.

The entire process can be operated at atmospheric pressure or over the range of from 0 to 100 lbs./sq. in. The reactor (15) temperature is of the order of 900° F. while the temperature in the reducer 32 may be of the order of 1200° F. High temperatures in the reducer encourage a more extensive reduction and therefore give the molybdenous oxide greater capacity for reducing carbon dioxide to carbon monoxide.

The final results of the preceding operation as described heretofore are to produce carbon monoxide having a purity of 99 per cent or better.

Instead of using powdered molybdenum oxide as the reducing agent for $CO_2$, I may use other VI group metal oxides, such as chromium oxide or tungsten oxide. Also in order to obtain better contact between the oxide and $CO_2$, it is desirable to impregnate the oxide on a spacing agent or carrier such as alumina, silica, or pumice in amounts such that, say, the molybdenum oxide or other oxide constituents compose 10–30 weight per cent of the total composition. Also other material such as iron, magnesium and zinc will reduce carbon dioxide when heated to the proper temperature. The reductions using these metals are usually followed by the deposition of free carbon and consequently, since the use of group VI metal oxide does not result in the deposition of substantial quantities of carbon, I prefer to use the latter type of oxide either alone or supported.

The chief advantage of my present process over existing methods of preparing carbon monoxide resides in the fact that when starting with substantially pure carbon dioxide (98 per cent) a product is obtained with carbon dioxide as the chief impurity and this is easily removed by scrubbing as previously explained.

Since carbon dioxide may be prepared relatively easily and inexpensively as by scrubbing flue gas with an aqueous solution of potassium carbonate and thereafter removing the dissolved carbon dioxide from the solution by heating, the need for pure starting material does not detract from the utility of my present process. In other words, it is relatively simple and inexpensive to prepare carbon dioxide having a purity of 98 per cent or better.

Numerous modifications of my invention may be made by those familiar with the art without departing from the spirit thereof.

What I claim is:

1. A continuous method for preparing substantially pure carbon monoxide which comprises continuously charging substantially pure carbon dioxide to a fluidized mass of a reduced VI group heavy metal oxide contained in a reaction zone, permitting contact between the carbon dioxide and the VI group metal oxide at elevated temperatures for a sufficient period of time to effect the desired conversion, withdrawing a product containing substantial quantities of carbon monoxide, recycling a portion of the said withdrawn product to the reaction zone, passing the remainder of said product through an absorption zone to remove unconverted carbon dioxide, recovering from the absorption zone a gaseous stream comprising substantially pure carbon monoxide, withdrawing the VI group metallic oxide from the reaction zone, conducting the latter to a reducing zone where it is formed into a dense suspension of said VI group metallic oxide in a hydrogen-containing gas, permitting the VI group metallic oxide to remain resident in the latter zone for a sufficient period of time to effect reduction of said VI group metallic oxide, removing the reduced oxide from the last-named zone and recycling it to the said reaction zone.

2. The method set forth in claim 1 in which the VI group metal oxide is molybdic oxide.

3. The method set forth in claim 1 in which temperatures up to 1200° F. are maintained in the reducing zone.

4. The method set forth in claim 1 in which the amount of hydrogen fed to the reducing zone is in slight stoichiometric excess of that required to reduce the VI group metal oxide from the valence of six to a valence of four.

CLINTON H. HOLDER.

REFERENCES CITED

The following references are of record in the file of this patent:

UNITED STATES PATENTS

| Number | Name | Date |
| --- | --- | --- |
| 1,719,867 | Arsem | July 9, 1929 |
| 1,913,364 | Bader et al. | June 13, 1933 |

OTHER REFERENCES

Mellor, "Treat. on Inorg. and Theor. Chem.," vol. 11, pp. 749, Longmans, Green, and Co., New York (1931).

"Thorp's Dictionary of Applied Chemistry," 4th edition, vol. II, Longmans, Green, and Co., New York (1938), p. 344.